United States Patent
Han et al.

(10) Patent No.: US 7,194,018 B2
(45) Date of Patent: Mar. 20, 2007

(54) APPARATUS FOR SEARCHING MULTIPATH IN SPREAD SPECTRUM COMMUNICATIONS SYSTEM AND METHOD THEREOF

(75) Inventors: Kyung-tae Han, Daejon (KR); Ik-soo Eo, Daejon (KR); Hae-bum Jung, Daejon (KR); Kyung-soo Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 713 days.

(21) Appl. No.: 10/211,416

(22) Filed: Aug. 1, 2002

(65) Prior Publication Data

US 2003/0103555 A1 Jun. 5, 2003

(30) Foreign Application Priority Data

Nov. 30, 2001 (KR) ................................. 2001-75274

(51) Int. Cl.
*H04B 1/69* (2006.01)
(52) U.S. Cl. ...................... 375/147; 375/130; 375/150; 375/316; 375/317
(58) Field of Classification Search ................ 375/147, 375/150, 316, 317, 130
See application file for complete search history.

(56) References Cited

U.S. PATENT DOCUMENTS

| | | | |
|---|---|---|---|
| 5,414,729 A | * | 5/1995 | Fenton ........................ 375/149 |
| 5,764,687 A | | 6/1998 | Easton |
| 5,949,815 A | * | 9/1999 | Pon ............................. 375/150 |
| 6,047,017 A | * | 4/2000 | Cahn et al. .................. 375/148 |
| 6,072,807 A | * | 6/2000 | Daudelin ..................... 370/465 |
| 6,393,046 B1 | * | 5/2002 | Kohli et al. ................. 375/134 |
| 6,868,110 B2 | * | 3/2005 | Phelts et al. ................ 375/144 |

FOREIGN PATENT DOCUMENTS

| | | |
|---|---|---|
| KR | P1999-028255 | 4/1999 |
| KR | P2000-0040468 | 7/2000 |

OTHER PUBLICATIONS

Sleewaegen, F. Boon "Mitigating Short-Delay Multipath: a Promising New Technique" Sep. 12, 2001, ION GPS 2001.*
Phelts, "Multipath mitigation for Narrowband Receivers" IEEE PLANS, Apr. 2000, pp. 1-7.*
Phelts, "The case forNarrowband Receivers" NTM 2000, Jan. 2000, pp. 1-7.*
A New Multipath Searcher for Direct Sequence Spread Spectrum Systems in Short Delay Channels, 4 pages.

* cited by examiner

*Primary Examiner*—Temesghen Ghebretinsae
*Assistant Examiner*—Juan Alberto Torres
(74) *Attorney, Agent, or Firm*—Blakely Sokoloff Taylor & Zafman

(57) ABSTRACT

A multipath searching device includes a radio front-end for converting a received radio signal into a baseband signal and for outputting the baseband signal. A profile calculating unit is included for calculating and outputting the multipath profile of the baseband signal. A first detector determines whether or not the radio signal traveled along a multipath is having a short-delay path by comparing the peak value of the multipath profile with a profile value of a predetermined position time interval before or after the peak of the multipath profile. A path selector receives the multipath profile and the detection result of the first detector, generates time delay information for each path, and separates many paths along which the radio signal traveled. A receiving unit receives the time delay information of the paths, despreads the baseband signal, and combines despread signals.

14 Claims, 10 Drawing Sheets

"PRIOR ART"

"PRIOR ART"

"PRIOR ART"

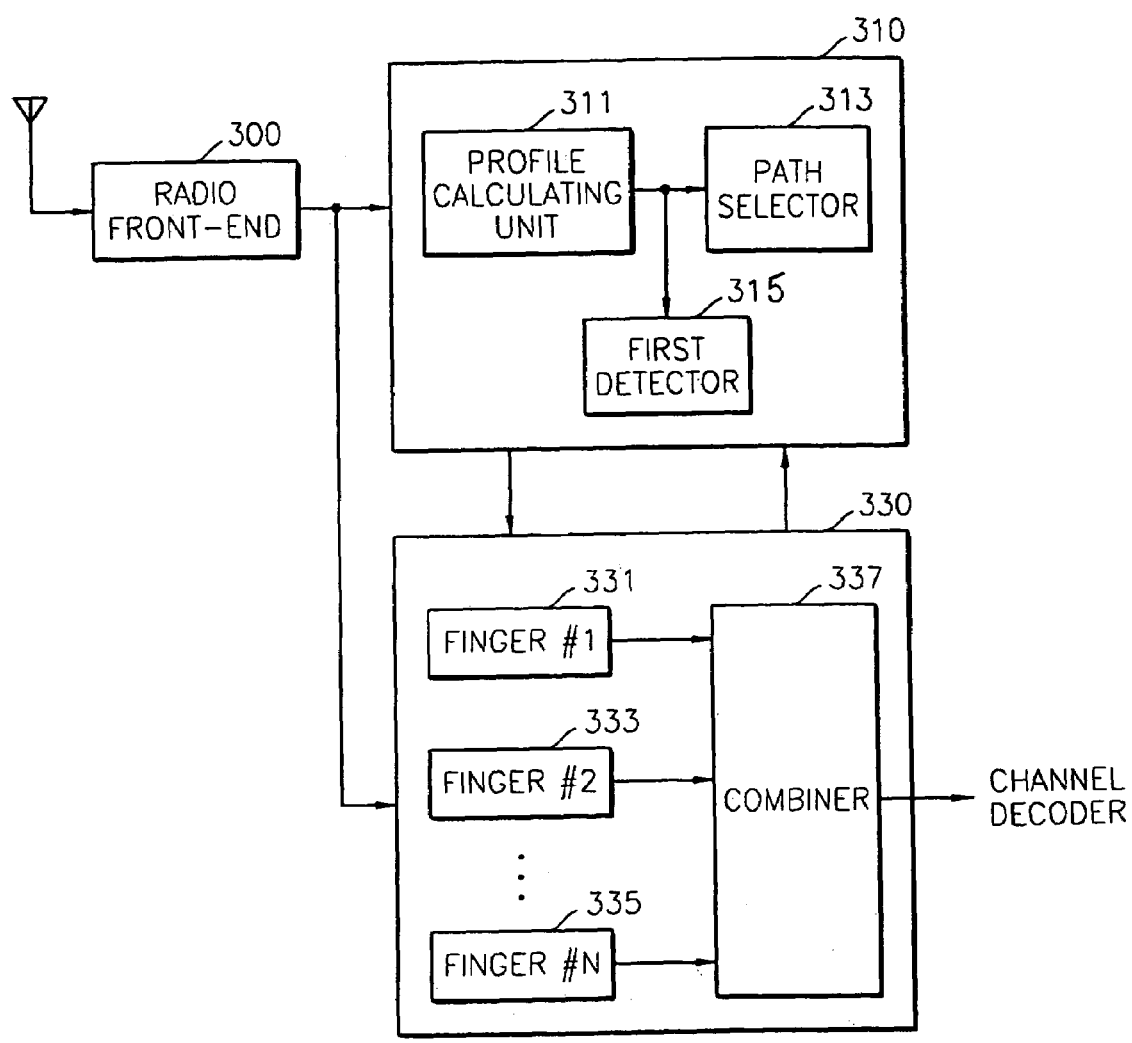

APPARATUS FOR SEARCHING MULTIPATH IN SPREAD SPECTRUM COMMUNICATIONS SYSTEM AND METHOD THEREOF

BACKGROUND OF THE INVENTION

1. Field of the Invention

The present invention relates to a spread spectrum communications system, and more particularly, to an apparatus for searching a multipath channel in a spread spectrum communications system, in which signals which are propagated through a multipath channel are received with different time delays, particularly with about 1 chip short-delays, and time delay information on each signal is searched for so that the time delay information can be allocated to a Rake receiver, and method thereof.

2. Description of the Related Art

In a spread spectrum communications system, when signals transmitted along a multipath channel are received by a receiver, the signals arrive at the receiver with different time delays. If the received signals are arranged and combined after compensating for the time delays, signals containing information become strong and noise signals containing no information become weak and therefore the performance of the receiver improves. To implement this, a multipath searcher for searching for different time delay information and a Rake receiver for arranging and combining signals using the time delay information are needed.

FIG. 1 is a structural diagram of an ordinary receiver. A radio front-end 100 converts a high frequency signal which is received through an antenna into a baseband signal and sends the baseband signal to a multipath searcher 130 and a Rake receiver 150. The signal demodulated in the Rake receiver 150 is input to a channel decoder for correcting errors which occurred in channels.

More specifically, the ordinary multipath searcher 130 includes a profile calculating unit 131 and a path selector 133. The profile calculating unit 131 calculates the power of a received information element so as to obtain the delay information of a signal which traveled along the multipath channel. In the spread spectrum communications system, a delay profile is obtained by using despread with respect to the delay time of a received signal. A delay profile can be obtained by calculating the power of an ordinary profile in order to remove the phase noise of the signal. The result of the calculated profile forms a shape in which a plurality of mountains gather together. The number of the peaks of the mountains indicates the number of paths in the multipath channel, and the distance between peaks indicates the time interval between paths of the multipath channel.

Meanwhile, the path selector 133 extracts time information for selecting paths of which signal power is strong among signals received through the multipath channel. The output of the profile calculating unit 131 is input to the path selector 133 and a peak higher than a predetermined value is selected. For selecting a peak, if the value of a current peak is greater than the values of the previous peak and the next peak, and greater than a predetermined value, then the current peak is selected. Time information elements of other peaks, each of which is calculated based on the peak having the highest value are sent to the Rake receiver 150.

Also, the Rake receiver 150 includes a plurality of fingers 151 through 155 for despreading the received signals, and a combiner for combining despread data elements. The baseband signal, which is the output of the radio front-end 100, and the same number multipath delay information elements, which are output from the path selector 133, as the number of fingers, are input to the Rake receiver 150. Respective fingers 151 through 153 compensate for time delays due to the multipath channel, by compensating for received signals input from the radio front-end 100 according to the time information elements obtained in the path selector 133. Then, respective compensated signals are despread so that data is restored. The combiner 157 combines data elements despread in the fingers 151 through 155 into one, and makes signals containing information stronger and noise signals containing no information relatively weaker so that the performance of the receiver improves.

However, in a channel environment where an about 1 chip short-delay may occur, such as inside a building or in an urban area, the prior art multipath searcher cannot separate multipath signals which traveled along the multipath channel.

SUMMARY OF THE INVENTION

To solve the above problems, it is an objective of the present invention to provide a multipath searching apparatus and method for separating a multipath signal having short-delay time, more particularly, an about 1 chip time delay.

To accomplish the objective of the present invention, there is provided a multipath searching apparatus having a radio front-end for converting a received radio signal into a baseband signal and outputting the baseband signal; a profile calculating unit for calculating and outputting the multipath profile of the baseband signal; a first detector for determining whether or not the radio signal traveled along a multipath having a short-delay path by comparing the peak value of the multipath profile with a profile value of a position which is a predetermined time interval before or after the peak of the multipath profile; a path selector for receiving the multipath profile and the detection result of the first detector, generating time delay information for each path, and separating a plurality of paths along which the radio signal traveled; and a receiving unit for receiving the time delay information of the paths, despreading the baseband signal, and combining despread signals.

Also to accomplish the objective of the present invention, there is provided a multipath searching method including (a) converting a received signal into a baseband signal and outputting the baseband signal; (b) obtaining a multipath profile based on the power of the baseband signal; (c) determining whether or not the received signal traveled along a multipath having a short-delay path by using the multipath profile, generating time delay information for each path by using the profile and the multipath having a short-delay, and selecting a path; and (d) receiving the time delay information of the paths, despreading the baseband signal, combining the signals and outputting the combined result.

BRIEF DESCRIPTION OF THE DRAWINGS

The above objects and advantages of the present invention will become more apparent by describing in detail preferred embodiments thereof with reference to the attached drawings in which:

FIG. 3 is a diagram of the structure of a multipath searching apparatus according to the present invention;

DESCRIPTION OF THE PREFERRED EMBODIMENTS

Figure 4:
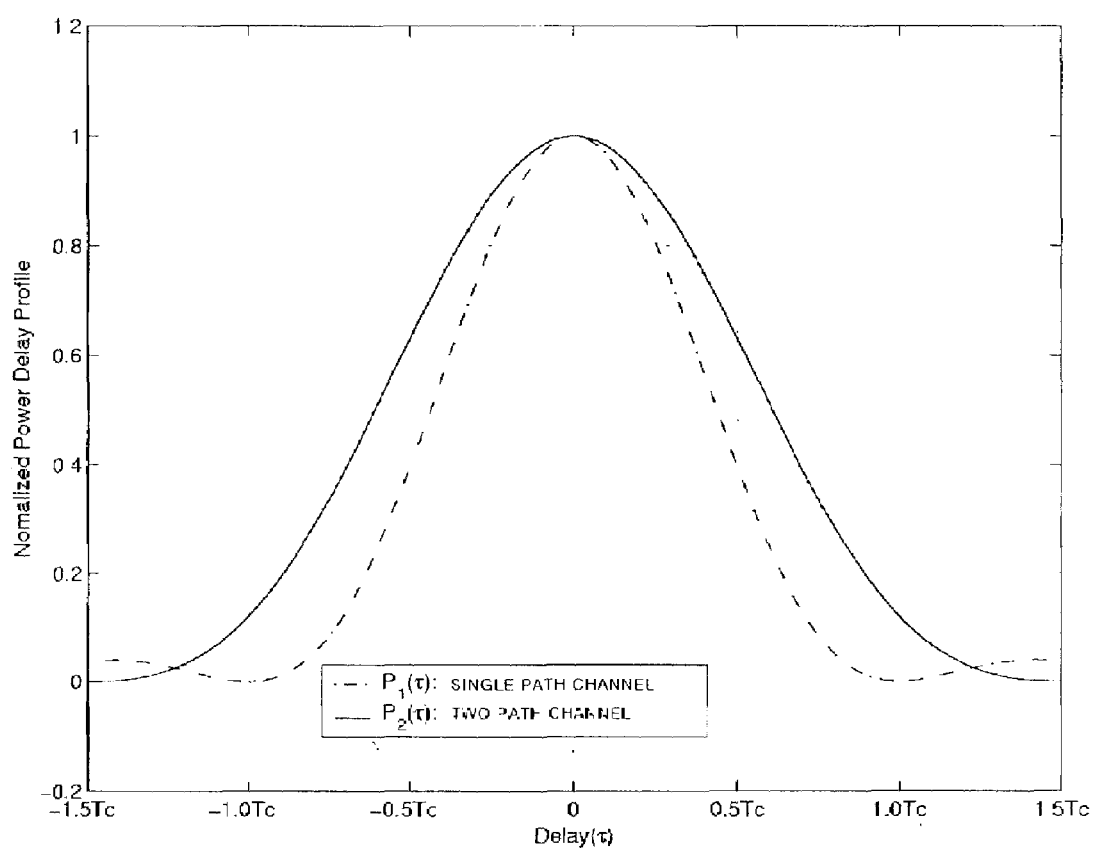
FIG. 4 is a graph showing the power profiles of two signals, one signal traveling along one path and the other signal traveling along two paths having a time difference.
Figure 5:
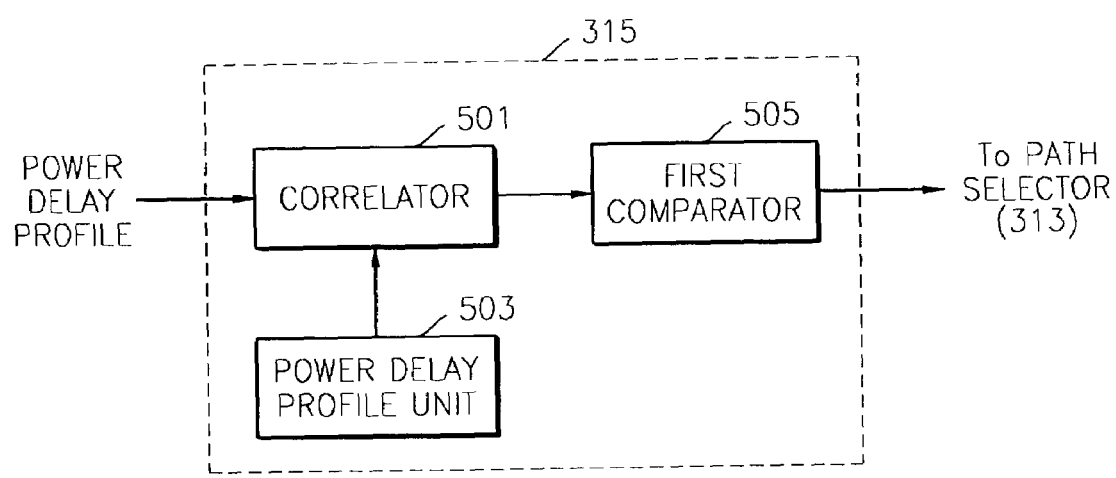
FIG. 5 is a diagram of a preferred embodiment of a detailed block of the multipath searching apparatus of FIG. 3.
Figure 6:
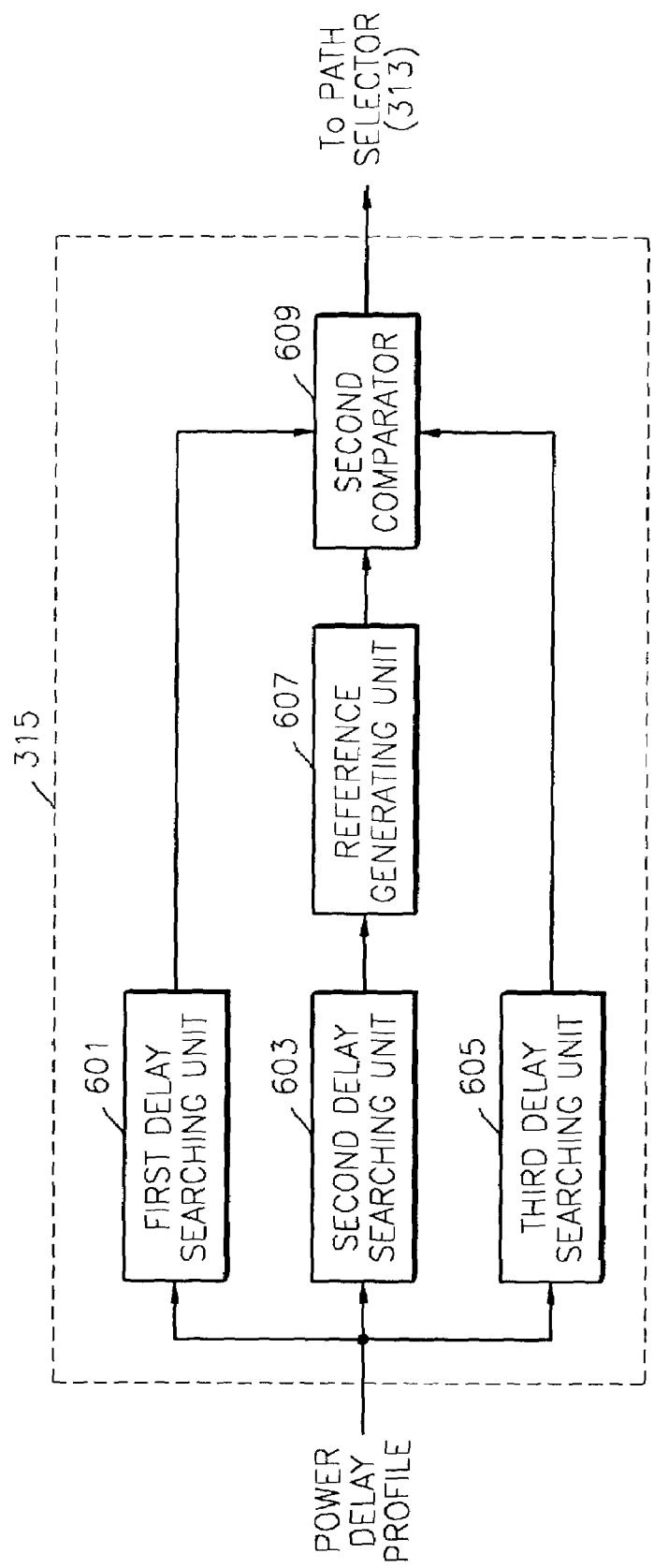
FIG. 6 is a diagram of another preferred embodiment of a detailed block of the multipath searching apparatus of FIG. 3.
Figure 7:
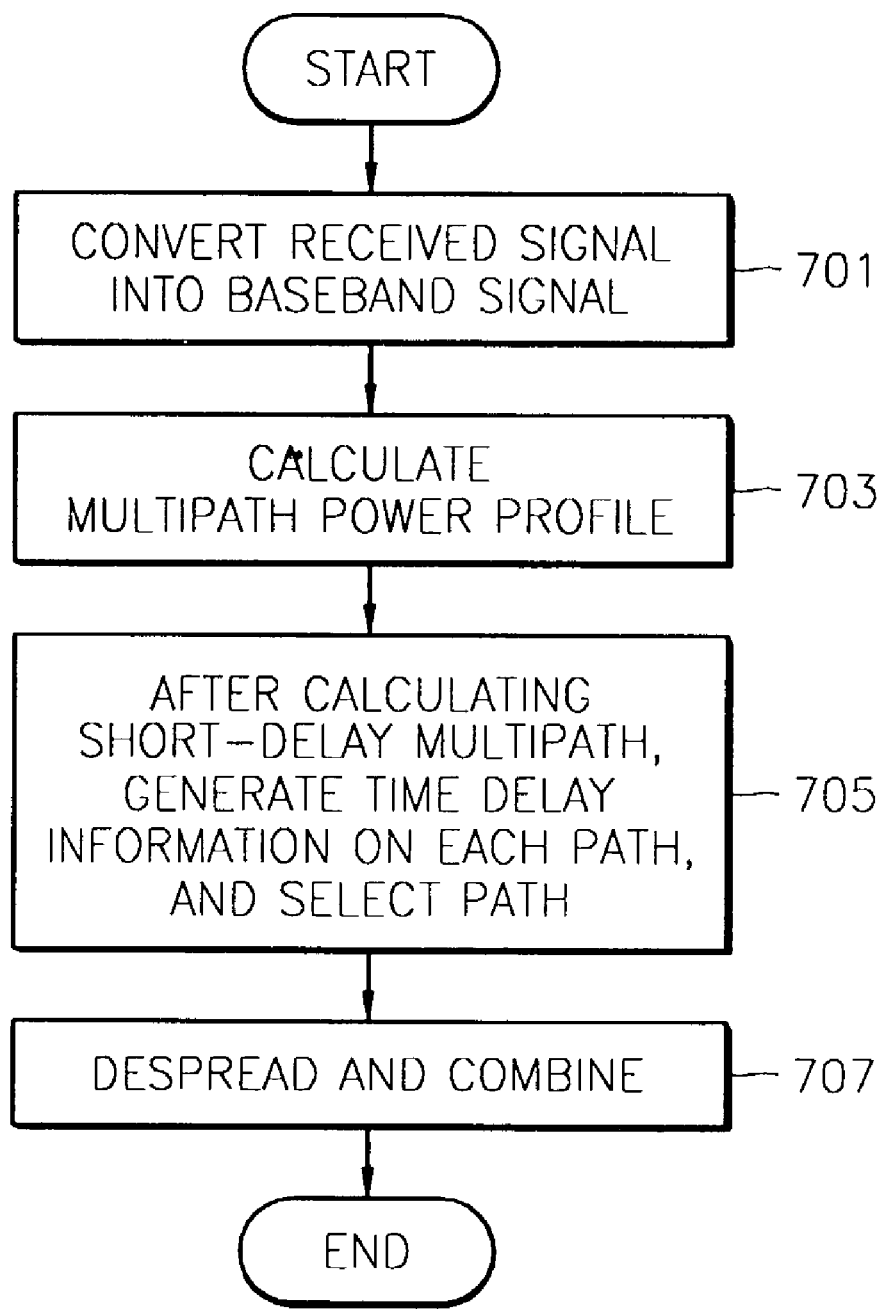
FIG. 7 is a flowchart showing a method for searching a multipath channel according to the present invention.
Figure 8:
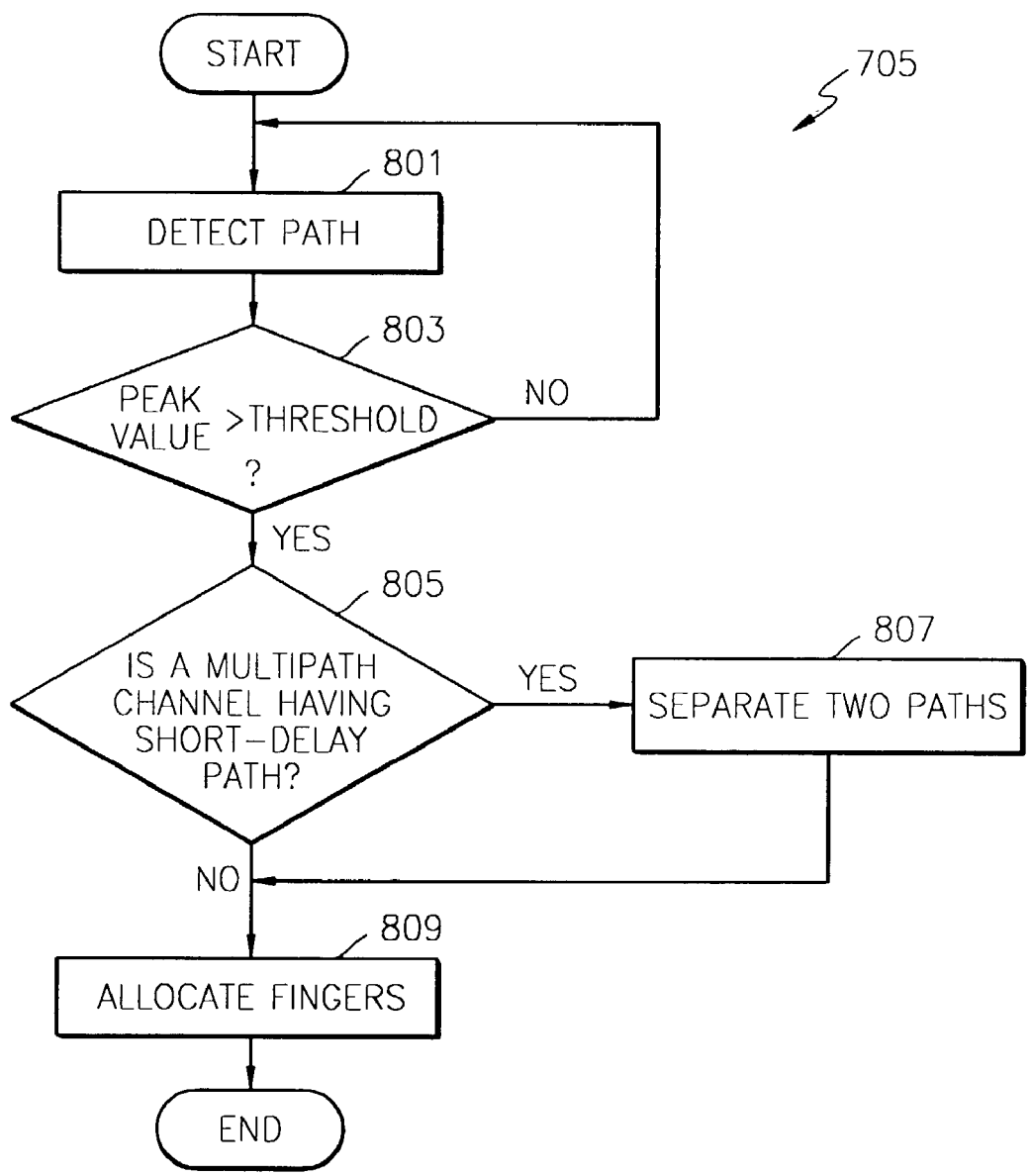
FIG. 8 is a flowchart showing a process for selecting a multipath channel having a short-delay.

FIG. 3 is a diagram of the structure of a multipath searching apparatus according to the present invention, and FIG. 4 shows a power profile when a signal travels along one path, and a power profile when the signal travels along another paths having a time difference. FIG. 5 shows an embodiment of a detailed block of the multipath searching apparatus of FIG. 3, and FIG. 6 shows another embodiment of a detailed block of the multipath searching apparatus of FIG. 3. FIG. 7 is a flowchart showing a multipath searching method according to the present invention, and FIG. 8 is a flowchart showing a process for selecting a multipath channel having a short-delay.

Figure 2A:
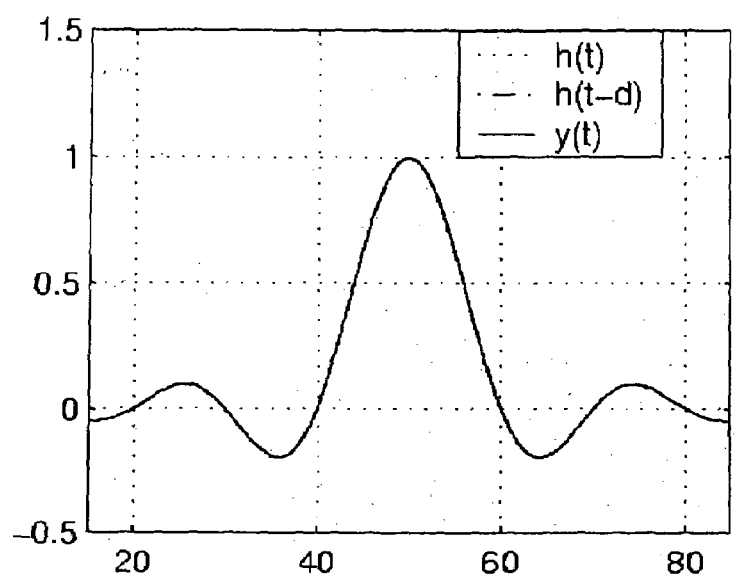
FIG. 2a is a graph showing a case where an impulse that passes through a raised cosine filter travels along one path.

First, the problems occurring when a signal travels along two paths having different time delays will now be explained referring to FIGS. 2a through 2d. In the spread spectrum communications system, a minimum unit for transmitting information is a chip. A transmitter uses a raised cosine filter in order to prevent interference between chips. The waveform of an impulse after passing through the raised cosine filter is shown in FIG. 2a. The vertical axis of the graph represents the magnitude of a signal and the horizontal axis represents the time points obtained by scaling one chip to 10. When a channel has only one path, the vertical axis value of a position on the curve at a time point 10 before or after the peak is 0, and therefore mutual interference between chips can be removed. When a channel is a multipath channel having two paths and an impulse is transmitted through the channel, two signals are overlapped, so two peaks are generated in a shape as shown in FIG. 2d. The distance between the two peaks is the time difference of paths in the multipath channel. Since the distance between the two peaks is 20, two signals arrive at the receiver at different time points having a 2-chip delay. The multipath searching apparatus 310 finds out 2-chip delay information, and the Rake receiver 330 combines two signals by using the 2-chip delay information so that the receiving performance can be improved. FIG. 2c shows a case when the difference of paths is about 1.5 chips. Also in this case, the multipath searching apparatus 310 combines the two signals using a 1.5-chip delay information so that the receiving performance can be improved.

Figure 2B:
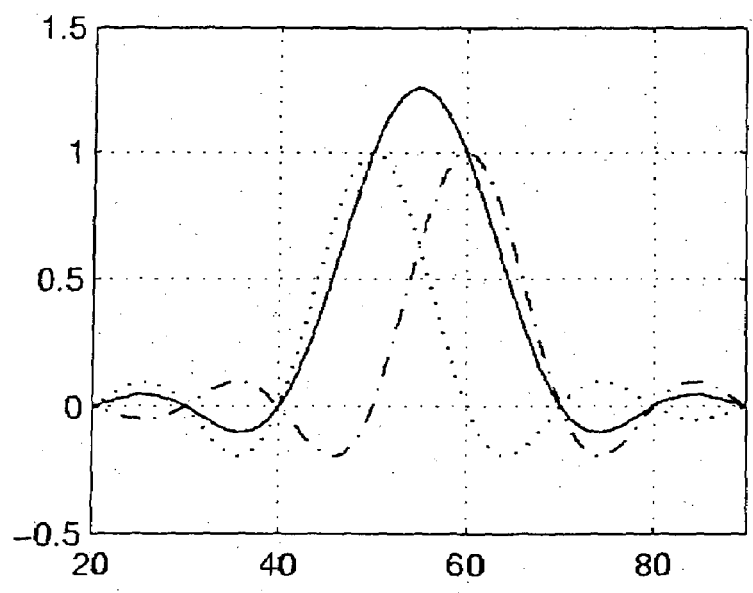
FIG. 2b is a graph showing a case where an impulse that passes through a raise cosine filter travels along two paths of which time difference is 1 chip.
Figure 2C:
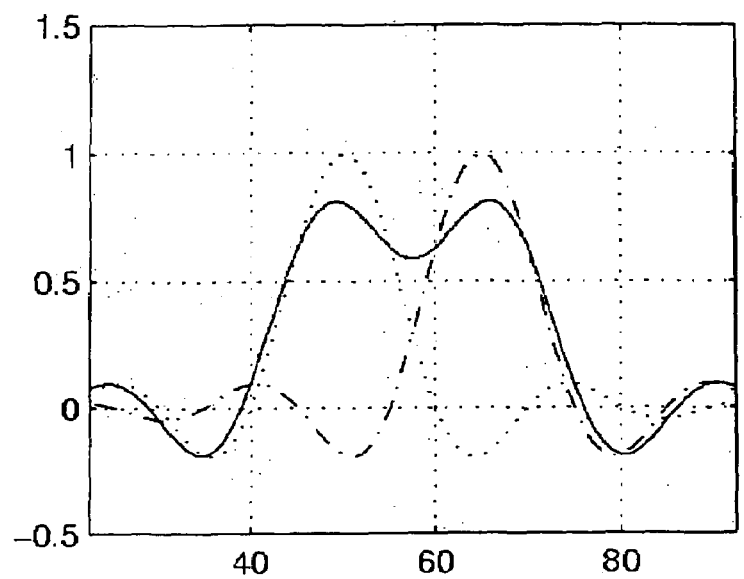
FIG. 2c is a graph showing a case where an impulse that passes through a raise cosine filter travels along two paths of which time difference is 1.5 chips.
Figure 2D:
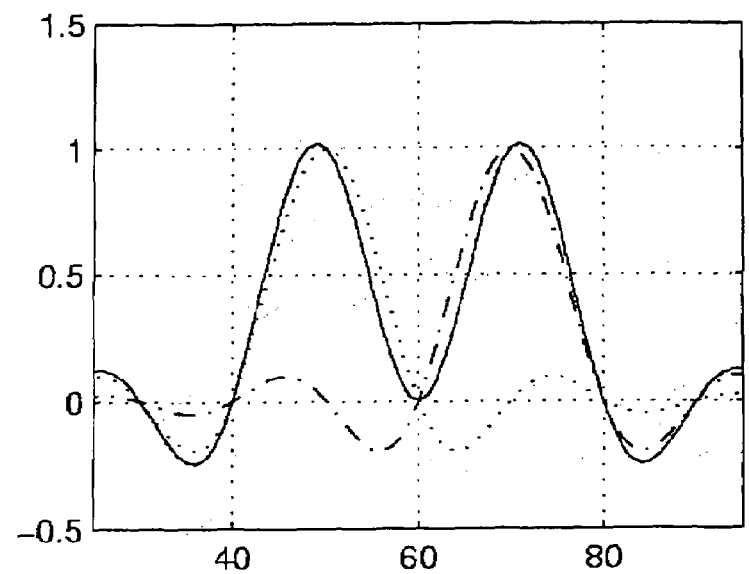
FIG. 2d is a graph showing a case where an impulse that passes through a raise cosine filter travels along two paths of which time difference is 2 chips.

However, when the difference of paths is 1 chip as shown in FIG. 2b, the following problem arises. That is, since two peaks which traveled along two paths are closely placed, two peaks look like one peak at a receiving end, and therefore, an ordinary multipath searcher 130 cannot recognize two paths and regards it as there was only one path. In this case, the multipath searcher 130 finds out a value corresponding to 55 which is a between value of 50 and 60 on the horizontal axis and sends only this information to the Rake receiver 150. Since the Rake receiver 150 receives only one information element, the Rake receiver 150 cannot combine two signals traveling along two paths, so the receiving performance is degraded.

Therefore, in order to solve this problem, that is, when two paths have an about 1-chip short time difference and the paths cannot be separated, the multipath searching apparatus and method thereof according to the present invention are provided to detect and separate the paths so as to allocate respective paths to the Rake receiver 330.

Figure 1:
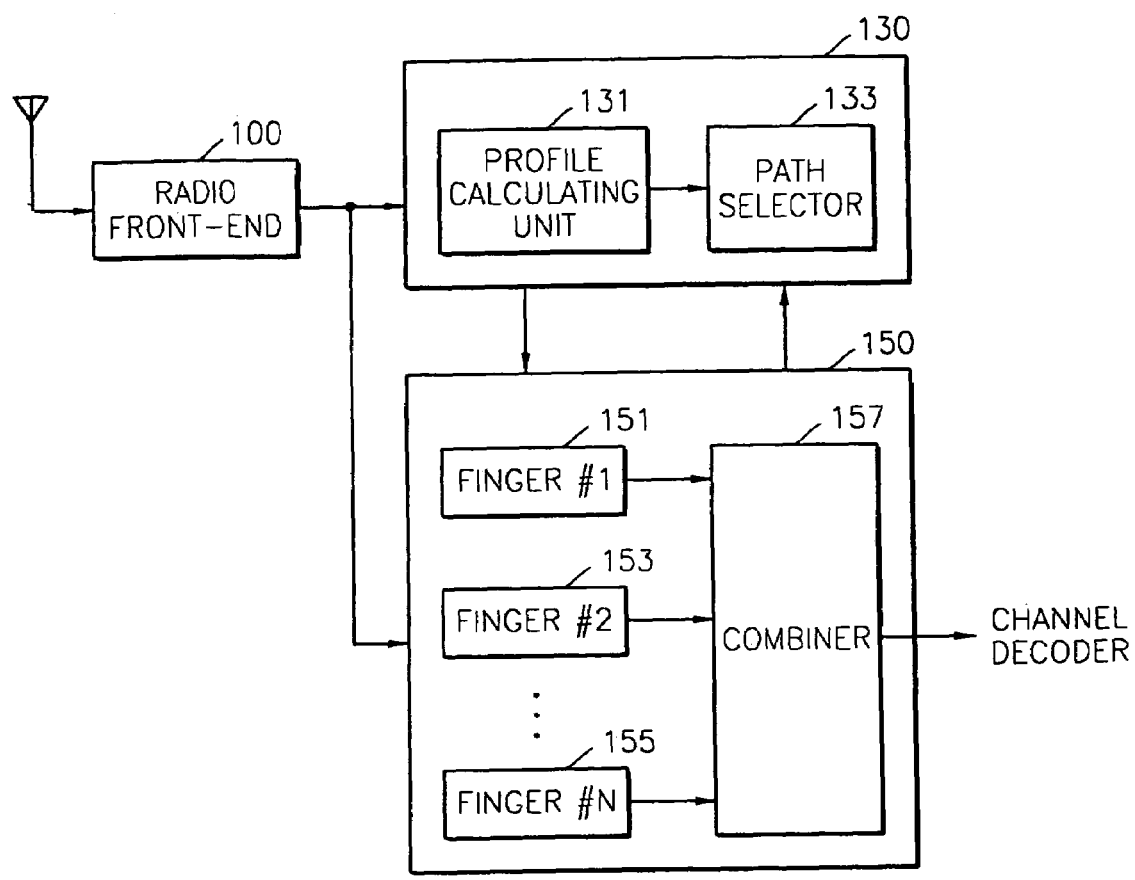
FIG. 1 is a diagram of the structure of a prior art multipath searcher and Rake receiver.

The basic structure of the multipath searching apparatus according to the present invention is as shown in FIG. 3, where a first detector 315 is added to the structure of the multipath searcher of FIG. 1. That is, the multipath searching apparatus according to the present invention includes a radio front-end 300 for converting a received signal into a baseband signal, a multipath detector 310 for receiving the baseband signal and detecting the multipath, a plurality of fingers 331 through 335 for receiving time delay information provided by the multipath detector 310 and the baseband signal, and compensating for time delays, and a combiner 337 for combining signals which are despread and demodulated, making signals containing information stronger and noise signals containing no information weaker, and sending the signals to a channel decoder.

Here, since the function of the Rake receiver 330 formed with the plurality of fingers 331 through 335 and the combiner 337 are well-known to a person in the art, the explanation of the Rake receiver 330 will be omitted.

The objective of the present invention to separate paths for signals that traveled along two paths having an about 1 chip short-delay will now be explained in detail.

First, a radio signal is converted into a baseband signal through the radio front-end 300 in step 701, and a power delay profile of the baseband signal is obtained in the profile calculating unit 311 in step 703. Obtaining the power delay profile is a preliminary step for searching the multipath of the radio signal which is received after traveling the multipath, and the power delay profile can be regarded as the average power of the signal with respect to a time delay. The step is a process for obtaining a value with respect to a time delay. To obtain the value with respect to a time delay, the received signal is despread by using a despread code of the receiver, the despread result is squared. By obtaining the average of the squared result, the value with respect to a time delay is obtained. Thus-obtained power delay profile has a different shape depending on whether a path has a short delay or not. This is shown in FIG. 4. Referring to FIG. 4, the solid line represents the power delay profile of a signal traveling along a multipath channel having a short-delay path, and the dotted line represents the power delay profile of a signal traveling along a single path without a delay path as is an ordinary case. In FIG. 4, in order to compare the two profiles, the peaks (maximum values) of the two profiles are normalized to 1, and the corresponding time points are adjusted to 0. As shown in FIG. 4, the shapes of the two profiles are similar to each other, the breadth of the solid line curve, that is, the breadth of the profile of the signal traveling along a multipath channel having a short-delay path is greater than that of the dotted line curve. In the present invention, using this difference, it is determined whether or not a received signal traveled along a short-delay path in step 705. FIG. 8 is a flowchart showing step 705 in more detail. That is, if the power profile of a received signal is calculated, the shape of a peak as shown in FIG. 4 is found out in step 801. At this time, by comparing a value indicated by the peak, that is, the maximum value, with a predetermined threshold, a meaningful peak is searched for. If the value is less than or equal to the threshold, the value is regarded to have no effective information and searching for a peak is continued in step 803. If the value is greater than the threshold, it is determined whether or not the signal traveled along a short-delay path in step 805. Here, an appropriate value obtained by experiments may be selected as the predetermined threshold. If the signal traveled along a multipath having a short-delay path, two paths are separated in step 807. This means that the peak which is expressed as one peak as shown in FIG. 2b is separated into two peaks, one right peak and one left peak. However, for a multipath having no short-delay path, only time information on one peak detected in step 803 is sent to the Rake receiver 330.

In order to perform these steps of FIG. 7, in conclusion, the first detector 315 detects the difference of the two profiles. Two embodiments for implementing the first detector 315 are shown in FIGS. 5 and 6, respectively. In FIG. 5, the first detector 315 is implemented using a correlator. In this case, the first detector 315 includes a correlator 501, a power delay profile unit 503 having a power delay profile when a signal traveled along a multipath channel having a short-delay path, and a first comparator 505 for determining whether or not a signal travel along a multipath channel having a short-delay path by comparing the result of the correlator 501 with a predetermined threshold.

The correlator 501 calculates correlation between a power delay profile which is the output of the profile calculating unit 311 and a profile provided by the power delay profile unit 503. That is, if the shape of the profile of a received signal is the same as the shape of the stored profile in the power delay profile unit 503, the resultant maximum value of the correlation is output. The output result is input to the first comparator 505. If the resulting value is greater than a predetermined value, the first comparator 505 regards the received signal as traveled along a multipath channel having a short-delay path, and outputs the information of decision to the path selector 313. The path selector 313 sends time delay information to the fingers 331 through 335. However, if the signal is not regarded as traveled along a multipath channel having a short-delay path, the path selector 313 does not perform an operation for separating the multipath.

Referring to FIG. 6, another embodiment for implementing the first detector will now be explained. While the embodiment of FIG. 5 has a complicated hardware structure of the correlator 501, the first detector can be implemented with a simple structure as shown in FIG. 6. First, the first detector of FIG. 6 will be briefly explained. Referring to the profile represented by the solid line in FIG. 4, when each of the magnitude of a position predetermined time before the peak (the maximum value) and the magnitude of a position predetermined time after the peak (the maximum value) is compared to a predetermined value, and the magnitude is greater than the predetermined value, it is determined that the signal traveled along two paths, and otherwise it is determined that the signal traveled along one path. The predetermined value may be appropriately selected referring to the profile shown in FIG. 4. For example, it is assumed that the resolution of the signal processing of the multipath searcher 310 is 0.5 chips. If the predetermined value at each of positions 0.5 chips before and after the peak is set to a half of the maximum value, the shape of the two profiles of FIG. 4 can be determined. Therefore, if each of the values of the positions on the input profile 0.5 chip before and after the peak is greater than a half of the maximum value, it can be determined that the signal traveled along a multipath channel having a short-delay path, and otherwise it can be determined that the signal traveled along a single path.

Referring to FIG. 6, the first detector of FIG. 6 will be explained in more detail. A first delay searching unit 601 calculates the profile value of a position a predetermined time interval (for example, here, the predetermined time is 0.5 chips) before the peak of the input profile, and a third delay searching unit 605 calculates the profile value of a position the predetermined time interval after the peak of the input profile. A second delay searching unit 603 calculates and outputs the maximum value of the profile. A reference generating unit 607 obtains a half of the maximum value obtained by the second delay searching unit 603. A second comparator 609 compares the result obtained in the first delay searching unit 601 and the result obtained in the third delay searching unit 605 with the value obtained in the reference generating unit 607. If the result of the comparison indicates that the profile values predetermined time interval before and after the peak are greater than a half of the peak value obtained in the reference generating unit 607, it is determined that the received signal traveled along a multipath having a short-delay path. Otherwise, it is determined that the received signal traveled along an ordinary multipath, and therefore, separating the multipath is not needed.

So far, the examples in which the time interval from the peak is 0.5 chips are explained. However, the 0.5 chip interval is just an example for explanation, and a chip interval can be freely determined depending on a variety of experiments and environments a signal passes through.

The path selector 313 receives the profile on the input signal from the profile calculating unit 311 and the profile of the multipath having a short-delay path from the first detector 315 at the same time. From the inputs, the path selector 313 obtains time information for allocating paths to the fingers 331 through 335 of the Rake receiver 330. That is, the profile of a signal which traveled along a multipath having about 1 chip short-delay time is represented by the solid line having one peak in FIG. 2b, but is separated into two peak as the dotted lines in FIG. 2b. That is, the profile which looks like having one peak is separated into two profiles having peaks 0.5 chip before and after the peak, respectively. Thus, signals which traveled along two paths and appear as one profile are accurately separated into two signals corresponding two paths. The path selector 313 sends time delay information on thus separated two paths to the fingers 331 through 335 of the Rake receiver 330. Therefore, the Rake receiver 330 obtained time delay information of signals which traveled along a multipath and compensates the signals for delays so that the receiving performance can be improved.

Figure 9:
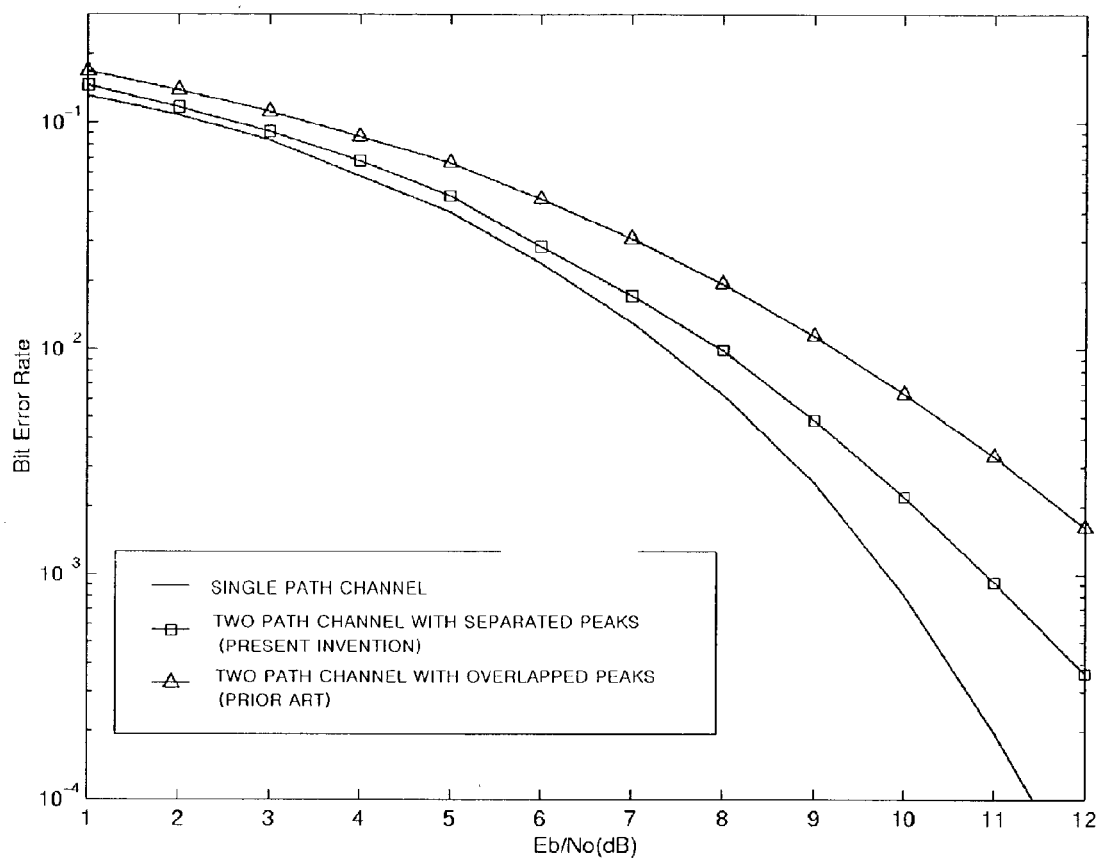
FIG. 9 is a graph showing bit error rates of the prior art multipath searching method and a multipath searching method according to the present invention.

FIG. 9 is a graph showing the receiving performances of the prior art multipath searcher and the multipath searching apparatus of the present invention when a signal traveled along a multipath channel having two different time delays in a Wideband Code Division Multiple Access (WCDMA) communications system. The line marked with triangles represents the prior art multipath searcher of FIG. 1. Here, signals which traveled along the two paths caused interference with each other and therefore only one path is found and the receiving performance is lowered. The line marked with squares represents the multipath searching apparatus of the present invention. Here, the multipath having a short-delay path are detected, and two paths are all found and allocated to fingers. As a result, receiving energy is gathered and the receiving performance is improved by about 1 dB.

The present invention may be embodied in a code, which can be read by a computer, on a computer readable recording medium. The computer readable recording medium includes all kinds of recording apparatuses on which computer readable data are stored.

The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be scattered on computer systems connected through a network and can store and execute a computer readable code in a distributed mode.

As described above, according to the multipath searching apparatus and method thereof for searching a short-delay multipath in a spread spectrum communications system, different paths in a channel having a short-delay which can occur in indoor or urban environment can be separated and received energy can be gathered so that the performance of the receiver can be improved.

| [Bibliography] | |
|---|---|
| [Document Name] | Patent Application |
| [Classification] | Patent |
| [Receiver] | Commissioner |
| [Reference No.] | 0001 |
| [Filing Date] | Nov. 30, 2001 |
| [IPC] | H04B |
| [Title] | Apparatus for Searching Multipath in Spread Spectrum Communications and Method Thereof |
| [Applicant] | |
| [Name] | Electronics & Telecommunications Research Institute |
| [Applicatant code] | 3-1998-007763-8 |
| [Attorney] | |
| [Name] | Youngpil Lee |
| [Attorney code] | 9-1998-000334-6 |
| [General Power of Attorney Registration No.] | 2001-038378-6 |
| [Attorney] | |
| [Name] | Haeyoung Lee |
| [Attorney code] | 9-1999-000227-4 |
| [General Power of Attorney Registration No.] | 2001-038396-8 |
| Inventor] | |
| [Name] | Kyung-tae Han |
| [Resident Registration No.] | 730618-1400220 |
| [Zip Code] | 300-020 |
| [Address] | 54-7 In-dong, Dong-gu, Daejon, Rep. of Korea |
| [Nationality] | Republic of Korea |
| [Inventor] | |
| [Name] | Ik-soo Eo |
| [Resident Registration No] | 620705-1117917 |

| -continued | |
|---|---|
| [Bibliography] | |
| [Zip Code] | 305-333 |
| [Address] | 102-504 Hanbit Apt., Eoeun-dong, Yusong-gu, Daejon Rep of Korea |
| [Nationality] | Republic of Korea |
| [Inventor] | |
| [Name] | Hee-bum Jung |
| [Resident Registration No.] | 580306-1675715 |
| [Zip Code] | 305-333 |
| [Address] | 132-506 Hanbit Apt., Eoeun-dong, Yusong-gu, Daejon Rep. of Korea |
| [Nationality] | Republic of Korea |
| [Inventor] | |
| [Name] | Kyung-soo Kim |
| [Resident Registration No.] | 511221-1093119 |
| [Zip Code] | 302-120 |
| [Address] | 305-706 Mokryun Apt., Dunsan-dong, Seo-gu, Daejon Rep. of Korea |
| [Nationality] | Replublic of Korea |
| [Request for Examination] | Requested |
| [Purpose] | We file as above according to Art. 42 of the Patent Law. |
| | Attorney Young-pil Lee |
| | Attorney Hae-young Lee |
| [Fee] | |
| [Basic page] | 20 Sheet(s) 29,000 won |
| [Additional page] | 5 Sheet(S) 5,000 won |
| [Priority claiming fee] | 0 Case(S) 0 won |
| [Examination fee] | 14 Claim(s) 557,000 won |
| [Total] | 591,000 won |
| [Reason for Reduction] | Government Invented Research Institution |
| [Fee after Reduction] | 295,500 won |
| [Enclosures] | |
| 1. Abstract and Specification (and Drawings) 1 copy | |

What is claimed is:

1. A multipath searching apparatus comprising:
    a radio front-end for converting a received radio signal into a baseband signal and outputting the baseband signal;
    a receiving unit for despreading the baseband signal, and combining despread signals;
    a profile calculating unit for calculating and outputting a multipath profile of the baseband signal;
    a first detector for determining whether or not the radio signal traveling along a multipath is having a short-delay path by comparing a peak value of the multipath profile with a profile value of a predetermined position time interval before and after the peak of the multipath profile, when the comparison result is greater than a predetermined threshold the signal is determined to have a short-delay path; and
    a path selector for receiving the multipath profile and the detection result of the first detector, separating the multipath profile into two profiles and two signals when the radio signal is determined to have a short-delay path, generating time delay information for each path, where the radio signal having a short-delay is sent to fingers of the receiving unit with the time delay information, wherein the receiving unit receives time delay information of the paths.

2. The apparatus of claim 1, wherein the profile calculating unit calculates a power profile based on the power of the radio signal.

3. The apparatus of claim 1, wherein the first detector comprises:
a power delay profile unit for storing a first power profile of a multipath signal having a short-delay;
a correlator for outputting a resulting value with respect to the correlation between the multipath profile and the first power profile; and
a comparator for determining that the signal traveled along a multipath having a short-delay path when the resulting value is greater than the predetermined threshold.

4. The apparatus of claim 1, wherein the first detector comprises:
a first delay searching unit and a third delay searching unit, each for outputting a power profile value at a position which is a predetermined time interval before or after the peak of the multipath power profile of the received signal;
a second delay searching unit for reducing the peak value of the multipath power profile of the received signal to a predetermined value and outputting the reduced value as a first peak value; and
a second comparator for determining whether the received signal traveled along a multipath having a short-delay path by using the output values of the first delay searching unit through the third delay searching unit.

5. The apparatus of claim 4, wherein the first delay searching unit obtains a power profile value at a position 0.5 chips after the peak of the multipath power profile of the received signal and the third delay searching unit obtains a power profile value at a position 0.5 chips before the peak of the multipath power profile of the received signal.

6. The apparatus of claim 4, wherein the second comparator determines that the signal traveled along a multipath having a short-delay path when the output values of the first and third delay searching units are greater than the first peak value.

7. The apparatus of claim 1, wherein the path selector obtains time delay information of the radio signal from the multipath power profile.

8. The apparatus of claim 7, wherein when it is determined that the received signal traveled along a short-delay path, the path selector allocates time delay information elements of positions predetermined time interval before and after the peak of the power profile to the receiving unit.

9. The apparatus of claim 7, wherein when the time delay information is allocated to the receiving unit, the path selector allocates the time delay information element of a position 0.5 chips before the peak and the time delay information element of a position 0.5 chip time after the peak, to the receiving unit.

10. A multipath searching method comprising the steps of:
(a) converting a received signal into a baseband signal and outputting the baseband signal;
(b) obtaining a multipath profile based on power of the baseband signal;
(c) determining whether or not the received signal traveling along a multipath is having a short-delay path by comparing a peak value of the multipath profile with a profile value of a predetermined position time interval before and after the peak of the multipath profile, when the comparison result is greater than a predetermined threshold the signal is determined to have a short-delay path, separating a multipath profile into two profiles and two signals when the signal is determined to have a short-delay path, sending the two separated signals to fingers of the receiving unit, and generating time delay information for each path; and
(d) receiving the time delay information of the paths, despreading the baseband signal, combining the signals and outputting the combined result, wherein it is unnecessary to separate multipath signals not having the short-delay path.

11. The method of claim 10, wherein step (c) comprises the steps of: wherein the two separated signals corresponding to two paths and allocating the two paths to a Rake receiver.

12. The method of claim 11, wherein step (c3) further comprises a step for generating time information of a position a predetermined time interval before or after the peak.

13. The method of claim 12, wherein the predetermined time is ±0.5 chip time.

14. A computer readable recording medium having embodied thereon a computer program for the method of claim 10.

* * * * *